Feb. 14, 1961 R. D. TORREY 2,972,060

LOGICAL ELEMENTS

Filed Aug. 18, 1955

INVENTOR.
ROBERT D. TORREY
BY
Charles C. English
AGENT

United States Patent Office 2,972,060
Patented Feb. 14, 1961

2,972,060

LOGICAL ELEMENTS

Robert D. Torrey, Philadelphia, Pa., assignor to Sperry Rand Corporation, a corporation of Delaware Filed Aug. 18, 1955, Ser. No. 529,284

9 Claims. (Cl. 307—88)

Figure 1:
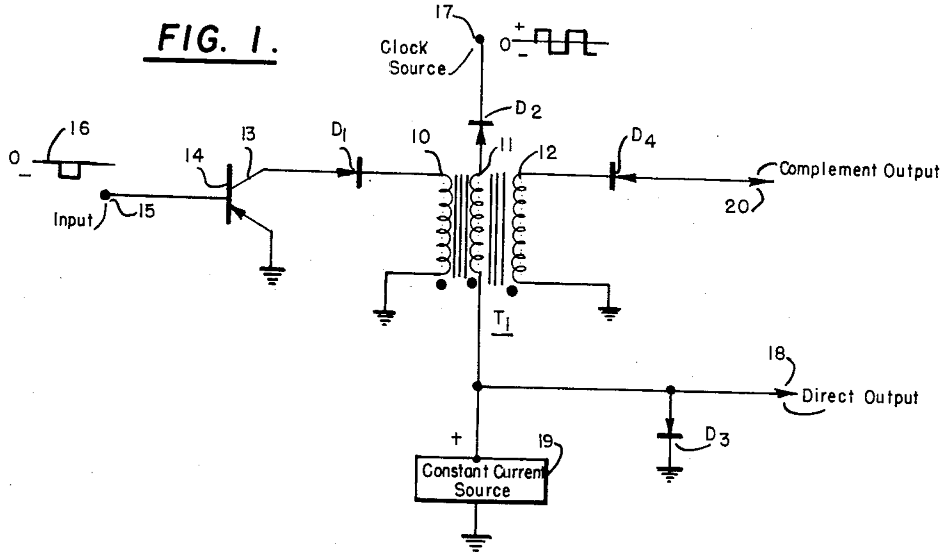

The present invention relates to logical elements such as may be employed in computing devices, and is more particularly concerned with a novel signal responsive element providing both direct and complement pulse type outputs.

It is often required in computing devices, for instance of the type employed in binary digital applications, to provide direct and complemented outputs in response to a signal input. In this respect, a direct output is defined as one occurring only in response to the presence of a signal input, while a complement output is defined as one occurring only in the absence of a signal input. In the past, such outputs have been provided by relatively complex structures, and in general, plural logical elements have been required for respectively providing each desired form of output.

The present invention serves to obviate this complexity and provides an improved logical element of simple construction having power gain, and which is capable of effecting both a direct and complemented output in a single structure. In particular, the present invention employs a transformer for effecting the desired outputs, and means such as a transistor may be so coupled to the transformer that the effective impedance of the said transformer may be selectively changed, thereby to provide desired outputs at plural points in the over-all circuit.

It is accordingly an object of the present invention to provide an improved logical element for use in computation devices.

A further object of the present invention resides in the provision of a logical element providing both direct and complement outputs in response to a signal input.

A still further object of the present invention resides in the provision of a logical element which is relatively simple in construction and which may be made in relatively small sizes.

A still further object of the present invention resides in the provision of a logical element comprising a transformer and transistor so interconnected with one another that direct and complemented outputs may be taken from plural points in the element in response to signal inputs selectively applied to the transistor.

Still another object of the present invention resides in the provision of an improved logical element having better operating characteristics than has been the case heretofore.

Another object of the present invention resides in the provision of a logical element having power gain while effecting both direct and complement outputs.

A further object of the present invention resides in the provision of a logical element selectively providing both direct and complement outputs in a unitary circuit structure.

The foregoing objects and advantages of the present invention are effected by providing a transformer preferably having at least three windings thereon. For purposes of the present discussion, it must be understood that the term "transformer" is meant to denote a structure wherein plural windings are inductively coupled to one another so that an input applied to one winding may be selectively taken from another winding. In this respect it will be appreciated that a structure, such as that specified, embodies certain aspects of magnetic amplifiers or of other magnetic structures, and such alternative structures are meant to be included within the over-all term "transformer."

In operation, the aforementioned three windings are so arranged that inputs may be selectively applied to one of the windings and outputs may be selectively taken from each of the other two windings. A source of energization or power pulses of the clock type are coupled to one end of the second winding for instance, whereby direct outputs may be selectively taken from the other end of the said second winding, and complement outputs may be selectively taken from the said third winding. The aforementioned signal inputs applied to the first winding are adapted to cause the said first winding to exhibit either an extremely low or relatively high impedance, and this variation in impedance may be effected, for instance, by causing a transistor coupled to the said first winding to have its state of conductivity changed under the control of a signal input. When the said first winding has its low impedance value, this low impedance is reflected into the second winding whereby the aforementioned clock pulses may pass to a direct output point coupled to the other end of the said second winding. In the alternative, when the said first winding exhibits its relatively high impedance, the potential of each clock pulse is substantially completely developed across the said first winding whereby transformer action effects complement outputs across the said third winding.

Figure 2:
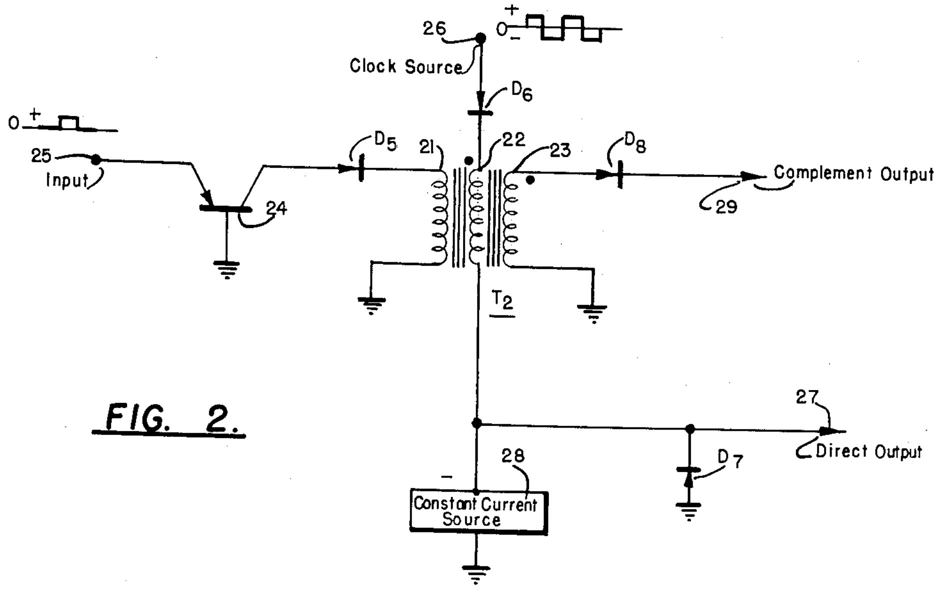

The foregoing objects, advantages, construction and operation of the present invention will become more readily apparent from the following description and accompanying drawings, in which:

Figure 1 is a circuit diagram of one form of the invention utilizing a grounded emitter transistor in the input circuit; and Figure 2 is a circuit diagram of another form of the present invention utilizing a grounded base transistor in the input circuit.

Referring now to Figure 1, it will be seen that, in accordance with the present invention, a logical element providing power gain and giving both direct and complemented outputs may comprise a transformer T1 having three coils 10, 11 and 12 inductively coupled to one another with the polarities indicated. One end of winding 10 is grounded, as shown, and the other end of the said winding 10 is selectively coupled via a rectifier D1 to the collector of a transistor 14. The emitter of transistor 14 is grounded, as shown, while the base of the said transistor 14 is coupled to an input point 15, to which may be applied selectively negative going signals of the type indicated at 16.

One end of transformer winding 11 is coupled via a rectifier D2 poled as shown, to a source 17 of clock pulses exhibiting regularly occurring positive and negative-going excursions. The lower end of transformer winding 11 may be coupled to a direct output point 18 and the said output point 18 may be selectively clamped at ground by a clamp rectifier D3 cooperating with a constant current source 19 connected to the said lower end of winding 11. One end of transformer winding 12 is also connected to ground, while the other end of the said transformer winding 12 is coupled via a rectifier D4 to a complement output point 20.

In operation, the rectifier D2 is rendered non-conductive by each positive-going excursion of the clock pulse source 17 and is rendered conductive during each negative-going excursion of the said clock pulse source 17 whereby current is drawn through the transformer winding 11 in response to the application of such negative-going clock pulses. If the transformer winding 11 should exhibit a relatively high impedance, substantially the entire voltage of the negative-going clock pulse from source 17 is developed across the said transformer winding 11 whereby a voltage is induced in winding 12 by transformer action thereby to give an output at point 20. If, on the other hand, the winding 11 should exhibit a relatively low impedance, the applied negative-going clock pulse will effect an output at the output point 18.

This operation will become more readily apparent by considering the actual effect of a signal input applied to terminal 15. Let us initially assume that no negative-going signal 16 is applied to terminal 15. Under these circumstances, the transistor 14 will be non-conductive whereby the collector 13 of the said transistor 14 is equivalent to an open circuit. Winding 10, coupled via rectifier D1, to the collector 13 is thus in an open circuit condition; and an applied negative-going clock pulse applied from source 17, will develop a potential across the relatively high impedance exhibited by transformer winding 11 whereby an output will appear, by known transformer action, at terminal 20. Inasmuch as no signal input has been applied to terminal 15 and an output nevertheless appears at terminal 20 for each negative-going clock pulse, the outputs at terminal 20 are complement outputs. The rectifier D1 serves to disconnect transistor 14 from transformer T1 during recovery of the said transformer.

For this no-signal input state, the constant current source 19, in cooperation with the clamp rectifier D3, maintains terminal 18 at substantially ground potential whereby no output appears at terminal 18. Thus, inasmuch as no signal input has been applied to terminal 15, the lack of signal output at terminal 18 is in effect a direct output, that is one which corresponds to the signal input state.

If a negative-going signal should be applied to terminal 15, the transistor 14 will be rendered conductive and as a result a short circuit will be effectively placed across the winding 10 of transformer T1. This short-circuiting of winding 10 effectively short-circuits the entire transformer T1 whereby winding 11 exhibits a very low impedance. An applied negative-going clock pulse from source 17, under these short-circuit conditions, will disconnect the clamp rectifier D3 from the output point 18 whereby a pulse output will appear at the said terminal 18. By the same token, and due to the short-circuiting of transformer T1, no output pulse will appear at terminal 20. Thus, once more, in response to a pulse input, a complement output (no pulse) appears at terminal 20 while a direct output (a pulse) appears at terminal 18. Thus, the simple arrangement of transformer T1 in combination with the clock source 17 and the transistor 14, permits both direct and complement outputs to be obtained with power gain.

The arrangement described in reference to Figure 1 has utilized a grounded emitter connection for the input transistor 14. Either grounded base or grounded collector connections may also be employed, and the particular example illustrated in Figure 2 shows a grounded base connection. Thus, referring to Figure 2 it will be seen that a logical element, in accordance with the present invention, may once more comprise a transformer T2 having three windings 21, 22 and 23 inductively coupled to one another. The winding 21 is again coupled at one of its ends to ground and is selectively coupled via a rectifier D5 to the collector of a transistor 24, the base of which transistor is grounded and the emitter of which is connected to an input point 25. Winding 22 is coupled at one of its ends via a rectifier D6 to a clock pulse source 26 and is coupled at the other of its ends to a direct output point 27 which is selectively clamped at ground potential by a clamp rectifier D7 and a constant current source 28. The transformer winding 23 is similarly coupled at one of its ends to ground, and is coupled at the other of its ends via a rectifier D8 to a complement output point 29.

It will be appreciated that by the particular arrangement illustrated in Figure 2, the circuit may be adapted to respond to positive-going inputs applied to terminal 25 rather than the negative-going inputs applied to terminal 15 in the example of Figure 1. The several polarity considerations discussed in reference to Figure 1 have been changed in the example of Figure 2 to conform to this opposite polarity input. Thus, rectifier D6 is reversed in polarity to rectifier D2 whereby the circuit selectively responds to positive-going clock pulses applied to terminal 26 rather than to the negative-going clock pulses of Figure 1. By the same token, the negative terminal of constant current source 28 is coupled to output point 27 and to the cathode of clamp rectifier D7 rather than the reverse polarity connections of constant current source 19 and clamp rectifier D3, discussed in reference to Figure 1.

The operation of the device shown in Figure 2 is essentially the same as that described in reference to Figure 1. Thus, in the absence of a positive-going input at terminal 25, the transistor 24 is non-conductive whereby transformer winding 21 is presented with an open circuit impedance. Positive-going clock pulses from source 26 thus develop potentials across winding 22 which are transformer coupled to winding 23 thereby to provide a complement output at terminal 29, while the direct output terminal 27 is clamped at ground potential by the action of constant current source 28 and rectifier D7. In response to a positive-going input pulse at terminal 25, however, transistor 24 is rendered conductive thereby to effectively short-circuit transformer T2; and by this short-circuiting, a positive-going clock pulse from the source 26 produces no output pulse at complement output point 29, but disconnects the clamp rectifier D7 thereby to provide a direct output pulse at terminal 27.

In the particular examples described above, PNP types of transistors have been illustrated for control purposes. It will be appreciated that NPN type transistors may be similarly employed and that, in addition, both junction and point contact transistors may be utilized in practicing the present invention. It should further be noted that while the described embodiments of the present invention have employed transistors which are normally non-conductive and which are rendered conductive in response to a signal input, thereby to effectively short-circuit the transformer employed, the converse of such operation is possible. That is the transistor employed may be normally conductive and an applied signal input may be utilized to cut off the transistor. In this alternative form of operation, the position of direct and complement output terminals illustrated in Figures 1 and 2, will be interchanged. In addition, rather than utilizing transistors, other forms of control elements or switching networks may be employed for selectively short-circuiting the transformer.

Still further modifications will be suggested to those skilled in the art, and it must therefore be emphasized that the foregoing discussion is meant to be illustrative only and should not be considered limitative of my invention, and all such modifications as are in accord with the principles discussed are meant to fall within the scope of the appended claims.

Having thus described my invention, I claim:

1. A logic circuit for producing complement output signals comprising an input terminal and a plurality of output terminals; means for supplying to said input terminal at certain times signals of the form of pulses and the absence of pulses; and means responsive to said pulses and to the absence thereof for respectively producing at said certain times pulses and the absence of pulses at a first one of said output terminals and for respectively producing at said certain times the absence of pulses and pulses at a second one of said output terminals, said responsive means including a pulse transformer having substantially no remanence and having a first winding connected at one terminal thereof to one of said output terminals, and having a second winding connected at one terminal thereof to another of said output terminals, means for supplying clock pulses of a certain polarity to another terminal of said first winding, and means responsive to said input signals for controlling the voltage across said first winding thereby to control the voltage at said one output terminal and to control the voltage induced in said second winding and the voltage at said another output terminal.

2. A logic circuit as recited in claim 1, wherein said responsive means further includes current responsive clamp means connected to said one output terminal for maintaining the voltage at said one output terminal unchanged for certain values of current in said first winding.

3. A logic circuit for producing complement output signals comprising an input terminal and a plurality of output terminals; means for supplying to said input terminal at certain times signals of the form of pulses and the absence of pulses; and means responsive to said pulses and to the absence thereof for respectively producing at said certain times pulses and the absence of pulses at a first one of said output terminals and for respectively producing at said certain times the absence of pulses and pulses at a second one of said output terminals, said responsive means including a pulse transformer having substantially no remanence and having a first winding connected at one terminal thereof to one of said output terminals and a second winding connected at one terminal thereof to another of said output terminals, means for supplying clock pulses of a certain polarity to another terminal of said first winding at the times of said input signals, and means responsive to an input pulse and to the absence thereof respectively for preventing and permitting changes in flux linking said windings and thereby controlling the voltage at said another output terminal.

4. A logic circuit for producing complement output signals comprising an input terminal and a plurality of output terminals; means for supplying to said input terminal at certain times signals of the form of pulses and the absence of pulses; and means responsive to said pulses and to the absence thereof for respectively producing at said certain times pulses and the absence of pulses at a first one of said output terminals and for respectively producing at said certain times the absence of pulses and pulses at a second one of said output terminals, said responsive means including a pulse transformer having a first winding connected at one terminal thereof to one of said output terminals, and having a second winding connected at one terminal thereof to another of said output terminals, means for supplying clock pulses of a certain polarity to another terminal of said first winding, and means responsive to said input signals for controlling the voltage across said first winding thereby to control the voltage at said one output terminal and to control the voltage induced in said second winding and the voltage at said another output terminal.

5. A logic circuit for producing complement output signals comprising an input terminal and a plurality of output terminals; means for supplying to said input terminal at certain times signals of the form of pulses and the absence of pulses; and means responsive to said pulses and to the absence thereof for respectively producing at said certain times pulses and the absence of pulses at a first one of said output terminals and for respectively producing at said certain times the absence of pulses and pulses at a second one of said output terminals, said responsive means including a pulse transformer having a first winding connected at one terminal thereof to one of said output terminals and a second winding connected at one terminal thereof to another of said output terminals, means for supplying clock pulses of a certain polarity to another terminal of said first winding at the times of said input signals, and means responsive to an input pulse and to the absence thereof respectively for preventing and permitting changes in flux linking said windings and thereby controlling the voltage at said another output terminal.

6. A logic circuit as recited in claim 4 wherein said means responsive to said input signals includes a third winding on said transformer and a transistor having three electrodes, first and second of said electrodes being connected to spaced points on said third winding and the third of said electrodes being coupled to said input terminal.

7. A logic circuit as recited in claim 4 wherein said responsive means further includes means in circuit with said first winding tending to maintain the current therethrough substantially constant during said clock pulses of said certain polarity and potential clamp means coupled to said first one of said output terminals and operable to maintain said first output terminal at a reference potential when the voltage across said first winding is at a maximum.

8. A logic circuit as recited in claim 4 wherein said responsive means further includes means in circuit with said first winding tending to maintain the current therethrough substantially constant during said clock pulses of said certain polarity and potential clamp means coupled to said first one of said output terminals and operable to maintain said output at a reference potential when the voltage across said first winding is at one value and wherein said means responsive to said input signals includes a third winding on said transformer and means coupled across said third winding and operable in response to said input signals in the form of pulses to provide a low impedance path across said third winding.

9. A logic circuit as recited in claim 4 wherein said means responsive to said input signals includes a third winding on said transformer and a transistor having a first, second and third electrodes, said first and second electrodes being connected between spaced points on said third winding and said third electrode being connected to said input terminal, and wherein said responsive means further includes a constant current source connected to said one output terminal for maintaining substantially constant current through said first winding during the period of said pulses of said certain polarity, potential clamping means including a diode coupled to said first one of said output terminals, said potential clamping means being operable to maintain said first output terminal at a reference potential when the voltage across said first winding is at a maximum, another diode interposed in circuit between said means for supplying clock pulses and said first winding said other diode being poled to allow current flow through said first winding only during clock pulses of said certain polarity, second diode means coupled in series with said second winding and said second one of said output terminals and poled to allow current flow through said second winding only in response to voltages induced in said second winding by voltages across said first winding.

References Cited in the file of this patent

UNITED STATES PATENTS

| | | |
|---|---|---|
| 1,935,413 | Prince | Nov. 14, 1933 |
| 2,253,129 | Lord | Aug. 19, 1941 |
| 2,709,798 | Steagall | May 31, 1955 |
| 2,813,207 | Bonn | Nov. 12, 1957 |
| 2,817,057 | Hollmann | Dec. 17, 1957 |
| 2,926,298 | Newhouse | Feb. 23, 1960 |

OTHER REFERENCES

Proceedings of the IRE, vol. 40, No. 11, page 1591, Fig. 9.

Radio Electronics Engineering, February 1954, pp. 13, 14, 15 and 20.